(No Model.) 2 Sheets—Sheet 2.
A. MOTE.
COMBINED CORN HARVESTER AND HUSKER.
No. 266,302. Patented Oct. 24, 1882.
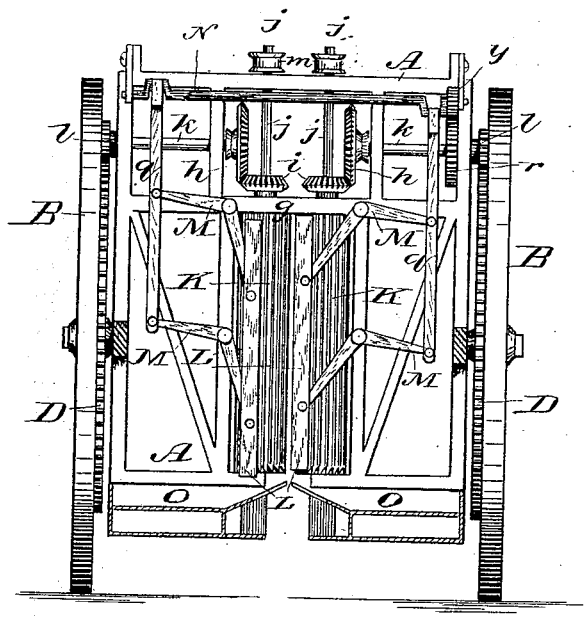
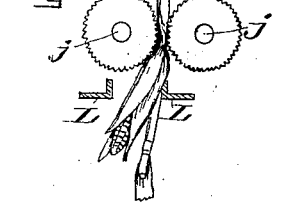
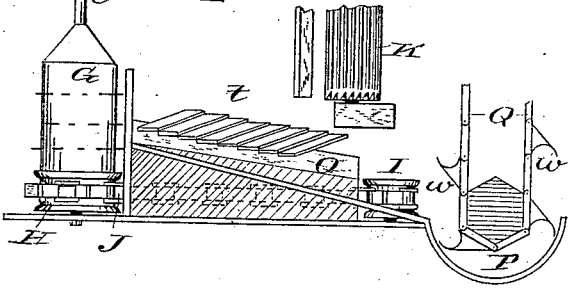
WITNESSES
INVENTOR

United States Patent Office.

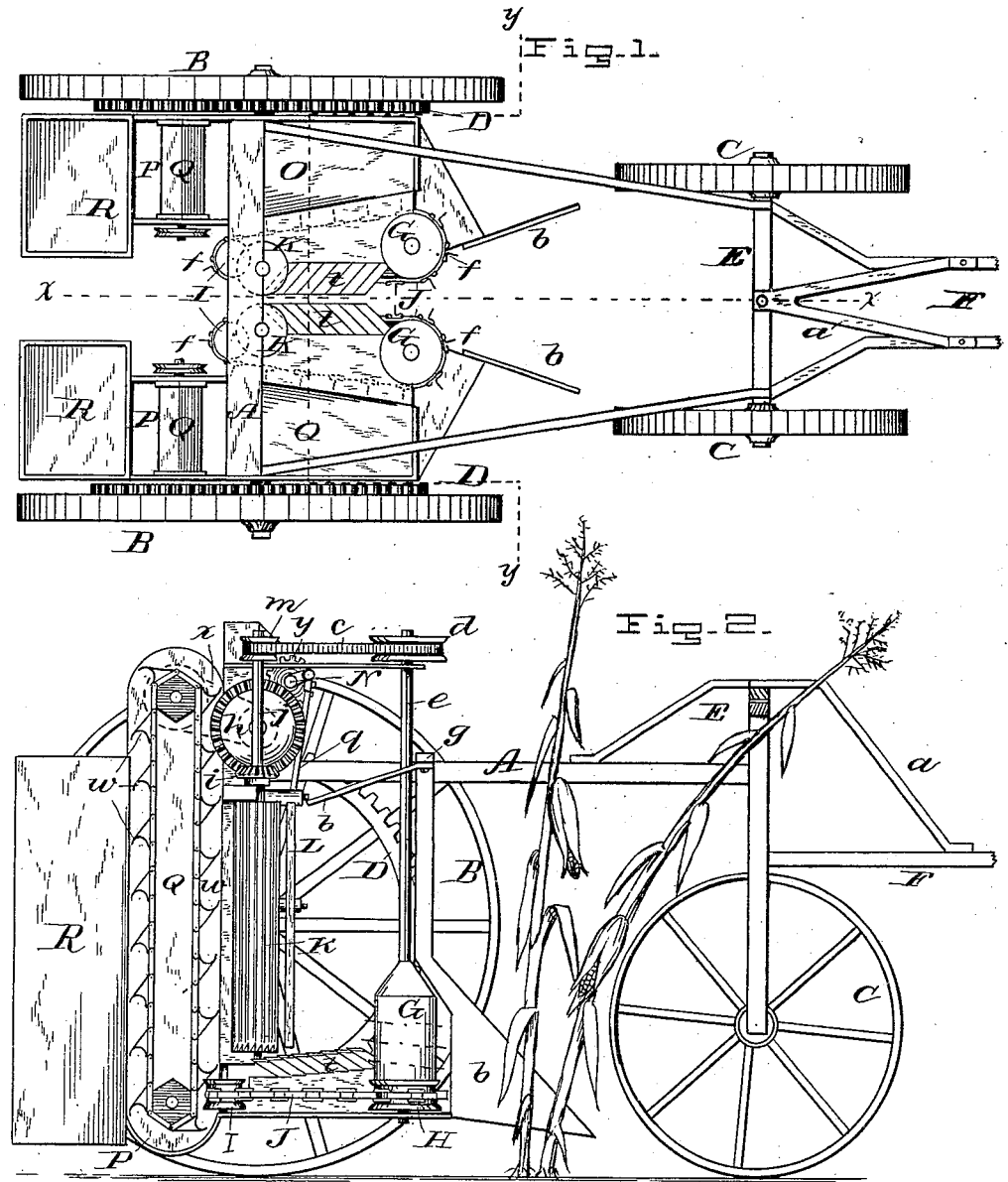

ALDEN MOTE, OF RICHMOND, INDIANA.

COMBINED CORN HARVESTER AND HUSKER.

SPECIFICATION forming part of Letters Patent No. 266,302, dated October 24, 1882.

Application filed July 19, 1882. (No model.)

*To all whom it may concern:*

Be it known that I, ALDEN MOTE, of Richmond, in the county of Wayne and State of Indiana, have invented certain Improvements in a Combined Corn Harvester and Husker, of which the following is a specification.

The invention relates to a corn-harvester designed to remove the ear from the stalk and husk it without breaking, cutting, or uprooting the stalk; and the invention consists in various features and combinations hereinafter fully set forth.

In the accompanying drawings, Figure 1 represents a top plan view of my machine with the pulleys and belts removed from the upper part; Fig. 2, a longitudinal vertical section on the line $x\ x$ of Fig. 1; Fig. 3, a vertical cross-section on the line $y\ y$ of Fig. 1; Figs. 4, 5, and 6, enlarged views, illustrating details of construction.

The machine consists essentially of a strong wheeled frame carrying a pair of corrugated vertical cylinders or rolls, mechanism for seizing and inclining the stalks and presenting them properly to said cylinders, a pair of vibrating or reciprocating bars arranged to strike the ears of corn when drawn close up to the cylinders and to break the stem or neck which joins the ear to the stalk, thus releasing the ear from the stalk and the husk, elevators and collectors for delivering the corn into receptacles, and gearing or mechanism for imparting the requisite motion to the various parts.

The construction and operation will be readily understood by referring to the drawings, in which—

A represents the framing of the machine, and B C the wheels by which said frame is carried, the wheels B being formed or provided with large gear-wheels D on their inner faces, by which motion is imparted to the operating parts, and the wheels C being mounted upon an arched axle, E, of sufficient height to pass readily over the stalks without breaking them down.

F represents the tongue by which the machine is drawn, said tongue being attached to the axle E and sustained by braces $a$, and bifurcated or divided, as shown in Fig. 1, in order to clear the row of stalks, which pass centrally through the machine. The two parts of the tongue are preferably made to diverge somewhat at the forward end to more readily gather in the stalks and guide them to the husking-cylinders.

In rear of the front axle are flaring wings or guides $b$, which direct the stalks between the two upright spiked or toothed rollers G, driven by belts $c$, passing about pulleys $d$, on the upper ends of their shafts or spindles $e$, as shown in Fig. 2. At the lower ends of the roller G, upon the same spindle, and preferably integral with the rollers, are formed pulleys or chain-wheels H, and at suitable distance in rear thereof, and in the same horizontal plane, are mounted similar pulleys or chain-wheels, I. Around each pulley or wheel H and the wheel or pulley I directly back of it passes a chain or band, J, armed with projecting wings or studs $f$, as more plainly seen in Fig. 1. The rollers G rotate, and the chains or bands J travel with just sufficient speed relatively to the travel of the machine to steady the stalks which pass between them, the upper ends of the stalks being struck and inclined forward by the cross-bar $g$ as the machine advances, thus creating the necessity for these supporting devices.

In rear of the spiked rollers G, and nearly over the pulleys or chain-wheels I, are two vertical corrugated cylinders, K, between which the stalks bent over by the cross-bar $g$ pass in an inclined position, thus bringing the ears to the cylinders successively. The cylinders K are driven by bevel-pinions $h$, meshing with pinions $i$ on their shafts or spindles $j$, and carried by horizontal shafts $k$, mounted in the framing A and furnished at their outer ends with pinions $l$, which mesh with the gear-wheels D of the driving-wheels B, as shown in Figs. 2 and 3. At their upper extremities the shafts or spindles $j$ carry pulleys $m$, from which belts $c$ pass to and around pulleys $d$ on the shafts or spindles $e$ of spiked rollers G, thus imparting motion to said rollers.

Just in front of the corrugated rollers K are two vibrating or reciprocating bars, L, each carried by elbow-levers M, which are reciprocated vertically each by a pitman, $q$, connected with a rotary crank-shaft, N, provided with pinions $y$, which gear with pinions $r$ on the shafts $k$, and thus receive motion, the bars L being moved back and forth across the space between the cylinders K, each bar advancing and retreating alternately with the other to and from the middle of the space in front of the cylinders. As the machine travels forward the stalks pass in between the two bars of the tongue, under the front axle, and between the guides b, then, being struck by the cross-bar g, and at the same time supported by the spiked rollers G and the belts or chains J, they are bent over forward and pass between the corrugated cylinders K in such inclined position, the cylinders being sufficiently separated to pass freely over the stalk proper. When, however, an ear is reached, it, being larger than the space between the two cylinders, is drawn closely up against the same, as shown in Fig. 5. The bars L, vibrating or reciprocating across the space between the cylinders K, strike the stalks, but they, being loose and free to move, are not injured thereby; but when the ear is thus firmly drawn up to and its stem held between the cylinders the bars L, striking the ears, break off the stems by which they are united to the stalks, but at a point inside the husk, so that the ears fall from the husk, which latter then passes between the cylinders. In this way the operation of husking is performed simultaneously with that of gathering the ears.

From the above description it will be seen that there is an open passage-way beneath and in front of the corrugated cylinders K to permit the machine to pass the stalks, and in order that the ears may not fall to the ground through this passage-way I provide a series of overlapping slats, t, each carried by an upright stem, u, about which is coiled a light spring, v, one end of which is made fast to the stem and the other to the framing of the machine. These slats are preferably inclined slightly backward from the line of travel, so as to offer as little resistance as practicable to the passage of the stalks between them, and thus to successively yield to permit the passage of the stalks and immediately return to position. In this manner the passage-way is at all times closed or bridged over, with the exception of the space actually occupied by the stalks. The slats t incline downward from the passage-way, as shown in Figs. 2, 3, 4, and 6, to cause the ears to roll to the inclined platform O, whence they will roll into concaves P at the rear of the machine.

Q Q represent two endless elevator-belts, each armed with buckets w, which take up the ears from the concaves P, and, carrying them upward, drop them over into boxes or receivers R, which may be removable or stationary, as desired. If fixed, the boxes R should have hinged or dumping bottoms, in order that their contents may be readily discharged when necessary. The elevators are driven by belts x from pulleys on the shafts k, as shown by dotted lines in Fig. 2.

In many minor details the machine may be modified—as, for instance, by arranging the bars L to slide or move on guides; by omitting the separate slats t, and employing at either side of the passage-way a spring-sustained bar capable of yielding at any point in its length; by substituting levers or gears for the belting shown, and vice versa, and in other respects falling in the domain of the mechanic rather than that of the inventor.

The cylinders K may be held to their normal position by spring or yielding pressure, if desired, to permit them to separate in case large or heavy matters enter between them, thus preventing injury to the machine.

I am aware that a vibrating guard has been placed in front of a pair of polygonal "picking" rollers for the purpose of preventing the points of the ears from entering first between the rollers; but in such case the rollers alone served to sever the ears from the stalks, the guard performing no part of said operation. Under my plan, however, the rolls simply serve to grasp the stem or neck of the husk or ear and to hold it while the vibrating or reciprocating bars break the stem and release the ear, leaving the husk attached to the stalk. Such result cannot be accomplished by the polygonal rollers, which break the stem and leave the husk upon the detached ear, or strip it therefrom after breaking it from the stalk.

Having thus described my invention, what I claim is—

1. In a corn-harvester, the combination of a pair of fluted upright rolls adapted to draw the stem by which the ear is joined to the stalk between them, and to firmly retain without breaking the same, and one or more reciprocating bars arranged to move across and in front of the space between the rolls, substantially as explained, whereby the bar is adapted to break the stem within the husk.

2. The herein-described corn-harvester frame, consisting of framing A, wheels B C, axle E, and cross-bar g.

3. In combination with the upright corrugated cylinders K, reciprocating bars L, and means, substantially such as shown and described, for imparting a reciprocating motion thereto.

4. In a corn-harvester, the combination of a frame provided with a cross-bar, g, a pair of upright corrugated cylinders in rear of said cross-bar, adapted to draw in, without breaking, the stem uniting the ears to the stalk, and one or more reciprocating bars, L, arranged, substantially as shown and described, to move across the space between the cylinders, and to strike and detach the ear held by the rollers, substantially as described.

5. The combination, in a corn-harvester, of a frame having a cross-bar, g, at a point sufficiently low to strike and bend over the stalks, and a pair of vertical toothed rollers below the cross-bar, as and for the purpose specified.

6. In a corn-harvester provided with a central passage-way for the stalks, a series of slats, t, each carried by an upright stem, u, provided with a spring, v, as and for the purpose set forth.

7. In combination with the husking-cylinders K and bars L, platform O, concaves P, and elevators Q, as and for the purpose explained.

8. In combination with the husking-cylinders K, bars L, platforms O, concaves P, and elevators Q, the receptacles R, all arranged substantially as shown.

9. The herein-described corn-harvester, consisting of frame A, having cross-bar $g$, rolls G, bands J, cylinders K, bars L, slats $t$, and elevators Q, and means, substantially as shown and described, for imparting motion to the various parts.

ALDEN MOTE.

Witnesses:
 JOSHUA G. HUNT,
 L. ALBERT MOTE.